United States Patent [19]

Taniguchi

[11] Patent Number: 4,673,077
[45] Date of Patent: Jun. 16, 1987

[54] ARTICLE SUPPLY APPARATUS

[75] Inventor: Shin ichi Taniguchi, Osaka, Japan

[73] Assignee: Takeda Chemical Industries, Ltd., Osaka, Japan

[21] Appl. No.: 825,267

[22] Filed: Feb. 3, 1986

[30] Foreign Application Priority Data

Feb. 14, 1985 [JP] Japan .................. 60-28087

[51] Int. Cl.$^4$ ............................. B65G 47/24
[52] U.S. Cl. ..................... 198/393; 198/397
[58] Field of Search ...................... 198/392, 393, 397; 271/157, 163, 167, 169

[56] References Cited

U.S. PATENT DOCUMENTS

| 845,415 | 2/1907 | Hicks | 198/392 |
|---|---|---|---|
| 887,298 | 5/1908 | Wilmore | 198/393 |
| 1,922,425 | 8/1933 | Evans | 198/393 |
| 2,538,706 | 1/1951 | Reynolds et al. | 198/397 |
| 2,916,165 | 12/1959 | Newton | 198/397 |
| 3,015,378 | 1/1962 | Thurlings | 198/393 |
| 3,042,183 | 7/1962 | Ackley | 198/392 |
| 3,215,251 | 11/1965 | Gleason | 198/392 |
| 3,318,434 | 5/1967 | Waller | 198/393 |
| 3,650,368 | 3/1972 | Nalbach | 198/397 |
| 3,889,591 | 6/1975 | Noguchi | 101/37 |
| 3,986,636 | 10/1976 | Hoppmann et al. | 198/392 |
| 4,279,336 | 7/1981 | Henderson et al. | |
| 4,354,602 | 10/1982 | Miyoshi et al. | 209/545 |

FOREIGN PATENT DOCUMENTS

| 353174 | 10/1979 | Austria . | |
|---|---|---|---|
| 2754189 | 10/1979 | Fed. Rep. of Germany . | |
| 596064 | 2/1978 | Switzerland . | |
| 619190 | 9/1980 | Switzerland . | |
| 1297083 | 11/1972 | United Kingdom | 198/392 |
| 1552843 | 9/1979 | United Kingdom . | |
| 284569 | 6/1971 | U.S.S.R. | 198/397 |

Primary Examiner—Joseph E. Valenza
Assistant Examiner—Cheryl L. Gastineau
Attorney, Agent, or Firm—Wenderoth, Lind & Ponack

[57] ABSTRACT

For transporting solid pharmaceutical products successively from a supply station to a processing station while they have been aligned in position, an article supply apparatus has a rotary transport drum supported for rotation in a plane inclined at an angle relative to a horizontal plane. The drum has its outer peripheral surface so tapered in one direction away from a drive shaft as to occupy a portion of the shape of a cone. The tapered outer peripheral surface of the drum is provided with a plurality of circumferentially equally spaced pockets so shaped and so sized as to accommodate the products therein. A hopper for receiving a batch of the pharmaceutical product is rigidly mounted on the drum for rotation together therewith.

8 Claims, 22 Drawing Figures

4,673,077

ARTICLE SUPPLY APPARATUS

BACKGROUND OF THE INVENTION

The present invention generally relates to an article supply apparatus and, more particularly, to the apparatus for supplying articles of identical shape, for example, solid pharmaceutical products such as tablets, pills or hard or soft capsules, in predetermined position or posture in readiness for the successive transfer of the articles onto an article handling device.

As exemplified by U.S. Pat. Nos. 3,889,591 and 4,354,602, patented June 17, 1975 and Oct. 19, 1982, respectively, and other numerous patent publications, for transporting pharmaceutical tablets successively from one station, for example, a supply station, to another processing station, while each of the tablets is aligned in position, a rotary drum is generally utilized of a type having a cylindrical outer peripheral surface formed, or provided, with at least one circumferentially extending row of circumferentially and radially equally spaced receptacles each for the support of the respective tablet by the effect of a suction force during the transportation thereof. The receptacles on the drum disclosed in the above mentioned U.S. Patents are each in the form of a radially inwardly recessed receptacle having a shape similar to the contour of the tablet handled thereby and are adapted to be communicated with a source of vacuum for exerting suction in the respective tablets only during the transportation from the supply station to a position a slight distance preceding the subsequent processing station.

At the supply station, the drum rotated continuously in one direction receives the tablets from a generally bottomless hopper having its open bottom overhanging and receiving therein a portion of the outer periphery of the drum so that some of the tablets which happen to sit in the respective receptacles can be sucked into and retained therein for the transportation.

A conventional tablet aligning apparatus utilizing the drum of the above described type in combination with the above described hopper has a handling capacity generally limited to about 400 tablets per minute at most while it has a problem in that a number of the tablets tend to be impaired at a location between the drum and the hopper.

On the other hand, the speed of inspection of the tablets has now been improved to about 1800 tablets per minute and, therefore, the development of a tablet handling apparatus having a tablet handling capability that can cope with the tablet inspecting speed is desired in the pharmaceutical field.

SUMMARY OF THE INVENTION

The present invention has been developed with a view to satisfying the need in the pharmaceutical field and has for its essential object to provide an improved article aligning device capable of delivering solid pharmaceutical products successively at high speed, for example, at a rate of 3600 tablets per minute, with the articles aligned in a predetermined position.

In order to accomplish the above described object, the present invention provides an article supply apparatus for solid pharmaceutical products each having a predetermined length, width and thickness which are randomly supplied into a hopper rotatable together with a rotary drum and which are successively taken out from the drum at a predetermined position adjacent an outer peripheral edge of the drum while having been aligned in a predetermined posture, said drum having its outer peripheral surface tapered with its axis inclined at a predetermined mined angle, a lower region of the outer peripheral surface having a plurality of radial projections of predetermined height so formed thereon and so spaced an approximately predetermined pitch from each other that product receiving pockets each having a width slightly greater than the thickness of each product are formed on that lower region of the outer peripheral surface of the drum, said hopper being mounted on the drum while a lower region of the hopper is spaced from the outer peripheral surface of the drum a distance slightly greater than the thickness of each product so as to extend substantially parallel to the outer peripheral surface of the drum and exteriorly covers at least respective portions of the product receiving pockets, there being provided means for taking the products in the pockets successively out from such pockets at a predetermined position confronting the drum, means detachably coupled with the drum for rotating the drum about the axis being provided so that the hopper can be rotated together with the drum to permit the products received in the pockets to be aligned in a direction thicknesswise thereof when the products are to be inserted into an upper region of the outer peripheral surface of the drum and then to be aligned in a direction widthwise when the products are to be inserted into the pockets from the upper region of the outer peripheral surface of the drum, whereby the products can be taken out one by one by said taking means in the predetermined posture.

Preferably, the length of each of the product receiving pockets is selected to be an integral multiple of the length of eachproduct so that the products can be successfully inserted into the respective pockets without the occurrence of bridging of the products.

BRIEF DESCRIPTION OF THE DRAWINGS

This and other objects and features of the present invention will become clear from the following description preferred embodiments thereof with reference to the accompanying drawings, in which like parts are designated by like reference numerals and in which:

FIGS. 13(a) and 13(b) to 16(a) and 16(b) are plan and side views, respectively, of different solid pharmaceutical products that can be handled by the apparatus of the present invention.

DETAILED DESCRIPTION OF THE EMBODIMENTS

Figure 1:
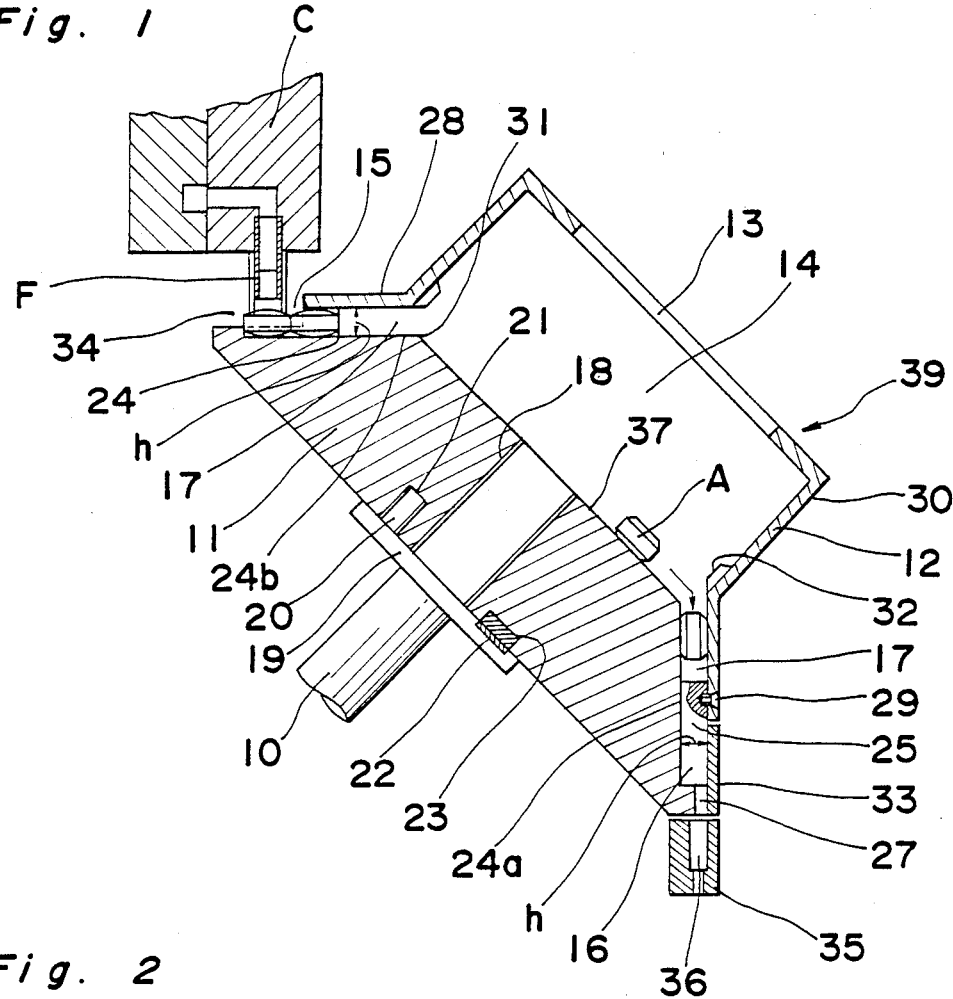
FIG. 1 is a schematic side sectional view of an article supply device according to a first preferred embodiment of the present invention.

An article supply apparatus according to the present invention is so designed and so constructed as to randomly supply a plurality of solid phramaceutical products so standardized as to have a predetermined length, width and thickness (the thickness, however, being smaller than the width which is in turn equal to or smaller than the length), and as to pick up the products individually, i.e., one at a time, after they have been aligned in a predetermined posture.

Referring now to FIGS. 1 to 4, the article supply apparatus for the solid pharmaceutical products A comprises an inclined drive shaft 10 adapted to be driven by an electric motor E, a transport drum 11 of frusto-conical shape detachably mounted on the drive shaft 10, and a generally cylindrical hollow hopper 12 rigidly mounted on the transport drum 11 for rotation together therewith. The hopper 12 has a hopper chamber 14 defined therein and also a supply opening defined therein at 13 in communication with the hopper chamber 14. The transport drum 11 has a plurality of product receiving pockets 16 which can be successively brought to a pick-up station 15 during the rotation of the drum 11 in one direction and also an aligning space 17 defined between the drum 11 and the hopper 12.

The transport drum 11 has a shape generally similar to a truncated right circular cone having its base provided with a mounting hole 18 in alignment with the axis thereof. The base of the transport drum 11 is provided with a pin socket 21 for receiving therein a connecting pin 20, which is rigidly mounted on an annular flange 19 rigid or integral with the drive shaft 10, and is provided with an iron piece 23 adapted to be magnetically attracted by a magnet 22 rigidly mounted on the annular flange 19. More specifically, when the transport drum 11 is mounted on the drive shaft 10 with the mounting hole 18 receiving therein the drive shaft 10 until the base of the drum 11 contacts the annular flange 19, the connecting pin 20 on the annular flange 19 is inserted into the pin socket 21 and the magnet 22 on the annular flange 19 attracts the iron piece 23, wherefore the rotation of the drive shaft 10 can be positively transmitted to the transport drum 11.

Figure 2:
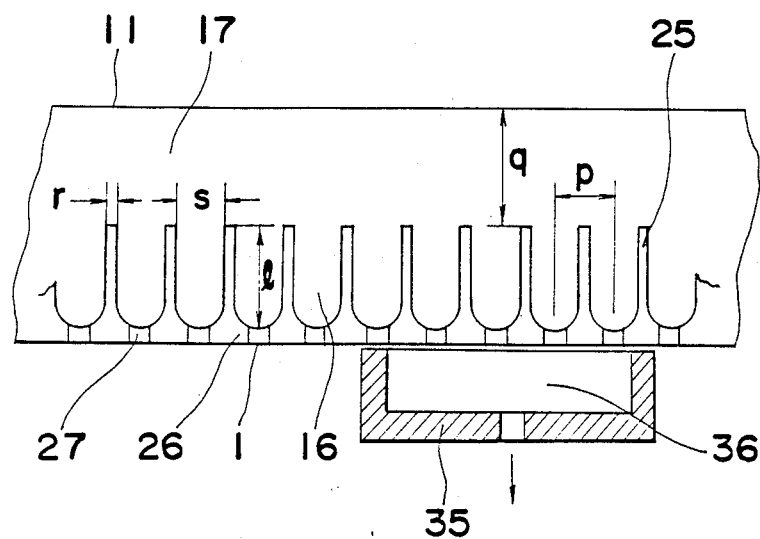
FIG. 2 is a plan view, on an enlarged scale, of a part of a drum used in the apparatus of FIG. 1 showing its outer peripheral surface developed in plan.

When and after the transport drum 11 has been mounted on the drive shaft 10, the end face of the shaft 10 is brought flush with the flat top of the drum 11 thereby to form a slide surface. The outer peripheral surface of the transport drum 11 tapering in a direction from the base of the drum 11 towards the flat top thereof is, as best shown in FIG. 2, provided with a plurality of radial projections 25 spaced circumferentially at intervals of a predetermined pitch P from each other and extending from the base of the drum 11 and terminating at a location generally intermediate of the width of the outer peripheral surface of the drum 11. Adjacent pairs of neighboring projections 25 define the respective pocket 16 referred to hereinbefore. Each of the projections 25 has a height h slightly greater than the thickness of each solid pharmaceutical product (for example, by 1 mm), and a length l equal to an integral multiple of, for example, twice, the length of the respective product while the spacing s between each neighboring projections 25 is slightly greater than the width of the respective product (for example, by 1 mm), so that each of the pockets 16 can accommodate two solid pharmaceutical products one above the other with the widthwise and thicknesswise directions of each of the products oriented towards the neighboring projections 25 and the outer peripheral surface of the drum 11, i.e., the bottom of the respective pocket 16, respectively, the upper one of the solid pharmaceutical products in each pocket 16 being positioned inwardly of the pocket with respect to the level extending in touch with the free ends of each of the neighboring projections 25. Each of the projections 25 has a predetermined width r which may be, for example, 1 mm and which may be so selected that the pockets 16 can be formed on the outer peripheral surface of the drum 11 at the approximately predetermined pitch p. Lower ends of the respective projections 25 are so continued through runners 26 to each other that no products received in the pockets 16 will fall down from the pockets 16, each of said runners 26 being formed with a fine groove 27 for the downward passage by gravity of dust and fine particulates of the solid pharmaceutical products out of the respective pocket 16. An upper portion of the outer peripheral surface of the drum 11 clear from the projections 25 serves as a slide surface having a width q greater than the length of each solid pharmaceutical product so that the products can freely slide therealong in a direction circumferentially of the drum 11.

The hopper 12 comprises a generally cylindrical hollow body 30 having one end closed by an end plate having the supply opening 13 defined therein, and an annular outwardly flared flange 28 protruding outwardly from the opposite end of the hollow body 30 so as to flare radially outwardly following the shape of the drum 11. The hopper 12 is mounted on the drum 11 for rotation together therewith and, for this purpose, the flared flange 28 is secured to some of the projections 25 by means of set screws 29 with the aligning space 17 formed between the outer peripheral surface of the drum 11 and the inner peripheral surface of the flared flange 28, said aligning space 17 being delimited by a spacing h which is slightly greater than the thickness of each of the solid pharmaceutical products. The width of the flared flange 28 is so selected that it can cover not only that portion of the outer peripheral surface of the drum which forms the slide surface, but also respective portions of the pockets 16 so that the products received in each pocket 16 will not fall down therefrom. The aligning space 17 serves to guide each product into the associated pocket 16 with the thicknesswise direction of said product oriented perpendicular to the outer peripheral surface of the drum 11, while permitting the products to move freely in a direction widthwise and lengthwise of each product.

The cylindrical hollow body 30 has a plurality of spaced scooper blades 32 secured to the inner peripheral surface thereof adjacent the flared flange 28 so as to protrude radially inwardly.

An annular guide plate 33 so tapered as to follow the shape of the transport drum 11 is fixedly supported on one side of the flared flange 28 remote from the body 30 and exteriorly around the drum 11 so as to cover the remaining portions of the pockets 16 not covered by the flared flange 28. A portion of the guide plate 33 in register with the pick-up station 15 is cut out to provide a pick-up port 34 through which the products successively transported to the pick-up station 15 during the rotation of the drum 11 can be removed out of the associated pockets 16. Positioned beneath the guide plate 33 is a vacuum ring 35 having a suction passage 36 which communicates with the fine grooves 27 in the runners 26 for sucking dust and fine particulates out from the pockets 16.

Figure 4:
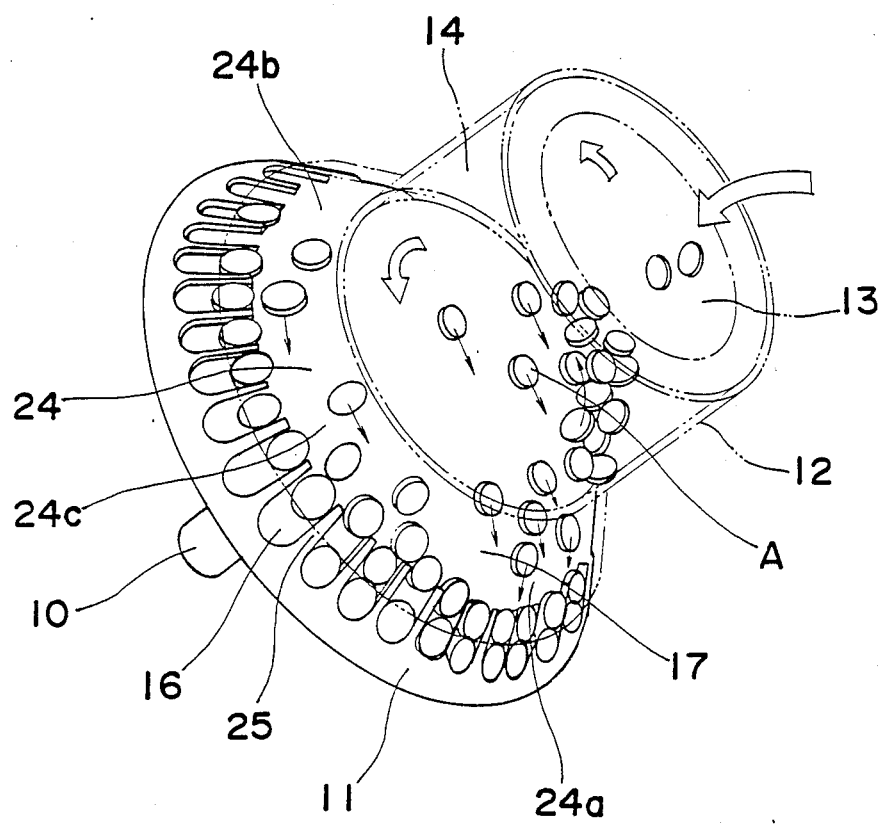
FIG. 4 is a perspective view of the apparatus of FIG. 1.

The hopper 12 is substantially coaxially fixed to the transport drum 11 and is in turn detachably mounted substantially coaxially on the drive shaft 10 together with the drum 11. Since the drive shaft 10 is so supported as to incline in a vertical plane at the predetermined angle, the outer peripheral surface of the drum 11 mounted on such drive shaft 10 is also inclined. By way of example, where the outer peripheral surface of the drum 11 is so tapered as to converge at an angle of 45° relative to the imaginary extension of the longitudinal axis of the drive shaft 10, a portion 24a of the outer peripheral surface of the drum 11 can lie generally in a vertical plate while the opposite portion 24b of the same spaced 180° from that portion 24a about the shaft 10 can lie in a plane perpendicular to the plane in which that portion 24a lies, as shown in FIG. 1. Accordingly, as the transport drum 11 is rotated together with the drive shaft 10, some of the pockets 16 are successively oriented downwards while some of the pockets are at the same time successively oriented horizontally as shown in FIG. 4, the products within the hopper 12 falling downwards through the aligning space 17 into some of the pockets 16 then oriented downwards, under the influence of a gravitational force and a centrifugal force. The products so received into the pockets 16 are, during the continued rotation of the drum 11, successively transported towards the pick-up station 15 at which one of the two products in each pocket 16 which is positioned adjacent the respective runner 26 is picked out from such pocket 16 through the pick-up port 34 in the annular guide plate 33.

Thus, it has now become clear that the solid pharmaceutical products A randomly supplied into the chamber 14 of the hopper 12 through the supply opening 13 slide downwards along the flat top 37 of the transport drum 11 into the aligning space 17 defined between the outer peripheral surface of the drum 11 and the flared flange 28 and subsequently into some of the pockets 16 then oriented downwards. When the products A slide downwards through the aligning space 17, the products A are so aligned as to have their thicknesswise directions oriented perpendicular to the outer peripheral surface 24 of the drum 11, and therefore, they can successively enter some of the pockets 16 then oriented downwards without forming any bridge of the products. Moreover, as the products A enter each of some of the pockets 16 then oriented downwards, they are so aligned as to have their widthwise directions oriented widthwise of each pocket 16. As the transport drum 11 is further rotated, the products, two in one pocket 16, are successively transported towards the pick-up station 15 at which the products A are laid horizontally in readiness for the removal thereof from the associated pockets 16.

Figure 3:
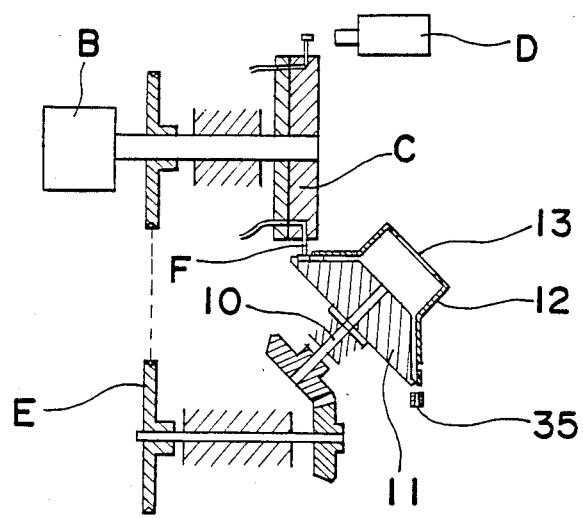
FIG. 3 is a schematic side sectional view, showing a drive system used in the apparatus of the present invention.

Each of the products A removed from the pocket 16 at the pick-up station 15 is delivered onto an inspection drum C shown in FIG. 3 so that it can be passed in front of an inspection camera D for the inspection of the product. The inspection drum and the transport drum are driven in synchronism with each other by means of a drive transmission system E including a set of bevel gears, pulleys and an endless belt or chain. The inspection drum C has a plurality of suction nozzles F spaced from each other a distance equal to the pitch between the neighboring pockets 16, each of said suction nozzles F being adapted to suck the product A out from the associated pocket 16 at the pick-up station 15 for the transportation thereof towards an inspection station where the camera D is installed. The inspection of the products may be for any desired purpose, for example, for determining whether or not each product has any detrimental flaw.

Figure 5:
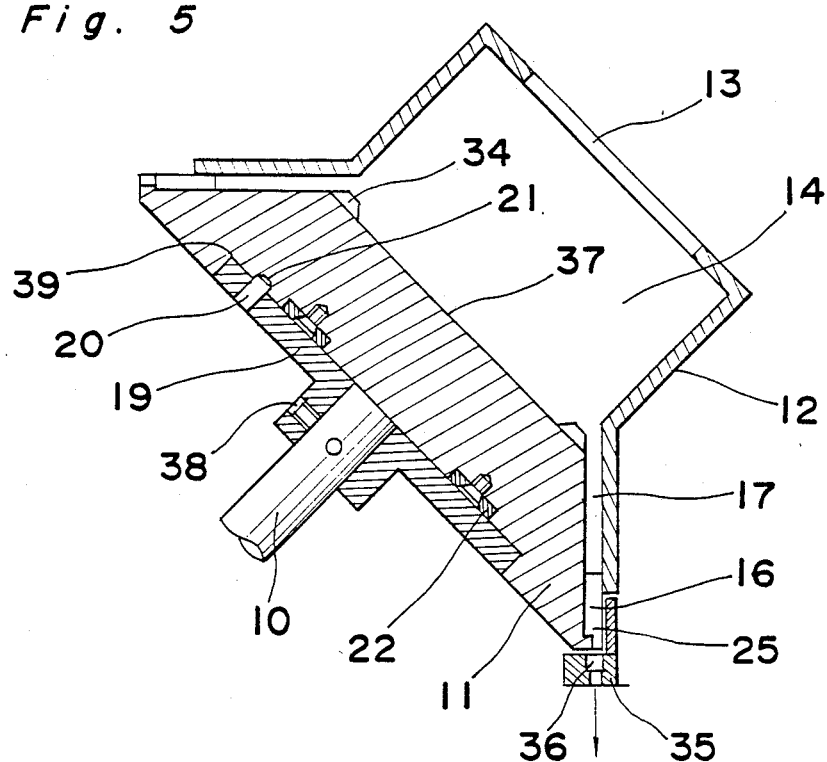
FIGS. 5 to 8 are views similar to FIG. 1, showing second to fifth embodiments of the present invention, respectively.

In the foregoing embodiment, the drive shaft 10 has been shown and described as received in the mounting hole in the drum. The connection between the drum 11 and the drive shaft 10 may not be always limited thereto, but may be in any manner. For example, in the embodiment shown in FIG. 5, the drive shaft 10 has a disc 19 rigidly mounted thereon and fixed thereto by means of at least one set bolt 38. The disc 19 is received in a circular recess 39 defined in the base of the drum 11. It is to be noted that the scooper blades 34 which have been described as secured to the hopper in the foregoing embodiment of FIGS. 1 to 4 are shown as secured to the flat top 37 of the drum 11.

Figure 6:
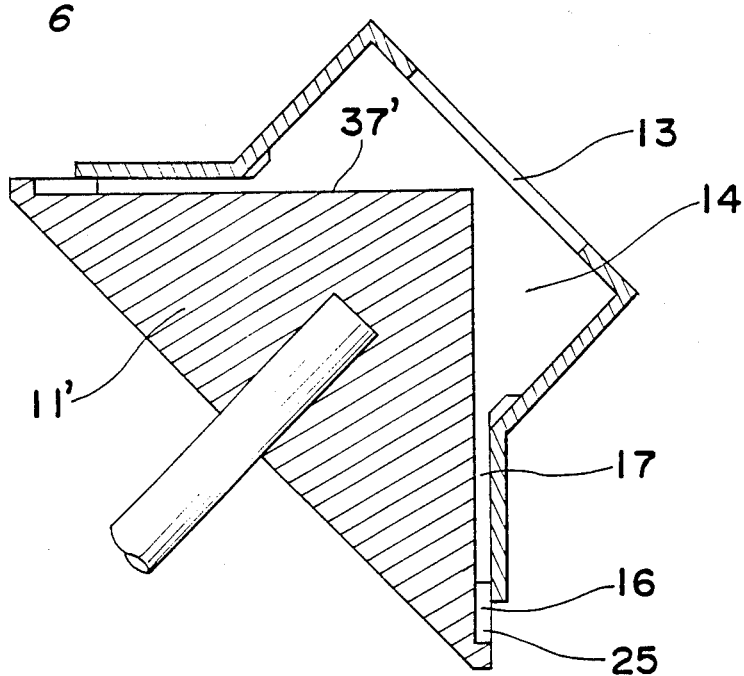
Figure 7:
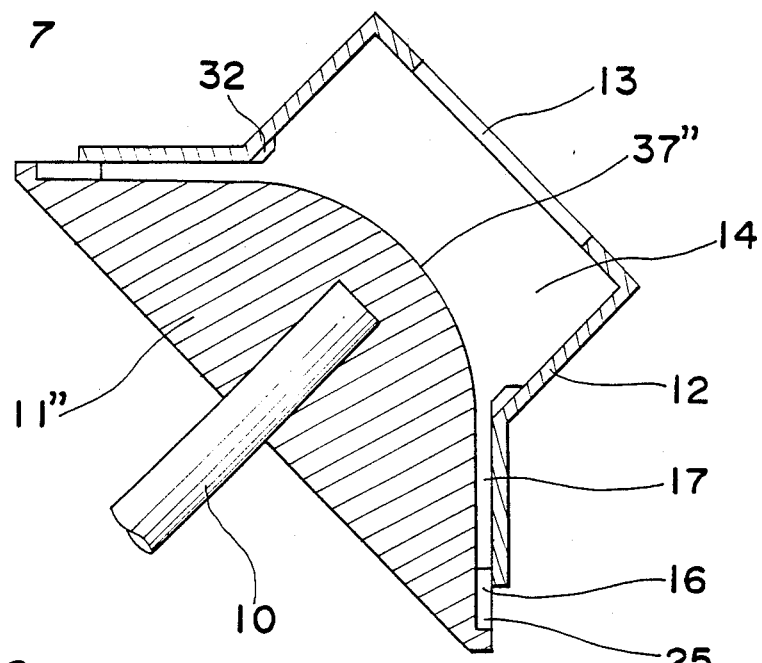

Moreover, the drum 11 may not be always frustoconical in shape as best shown in FIG. 1, but may be conical as shown in FIG. 6, in which case an apex portion 37' is situated within the cylindrical hollow body 30 of the hopper 12, or generally conical with its apex area rounded as shown by 37" in FIG. 7.

Figure 8:
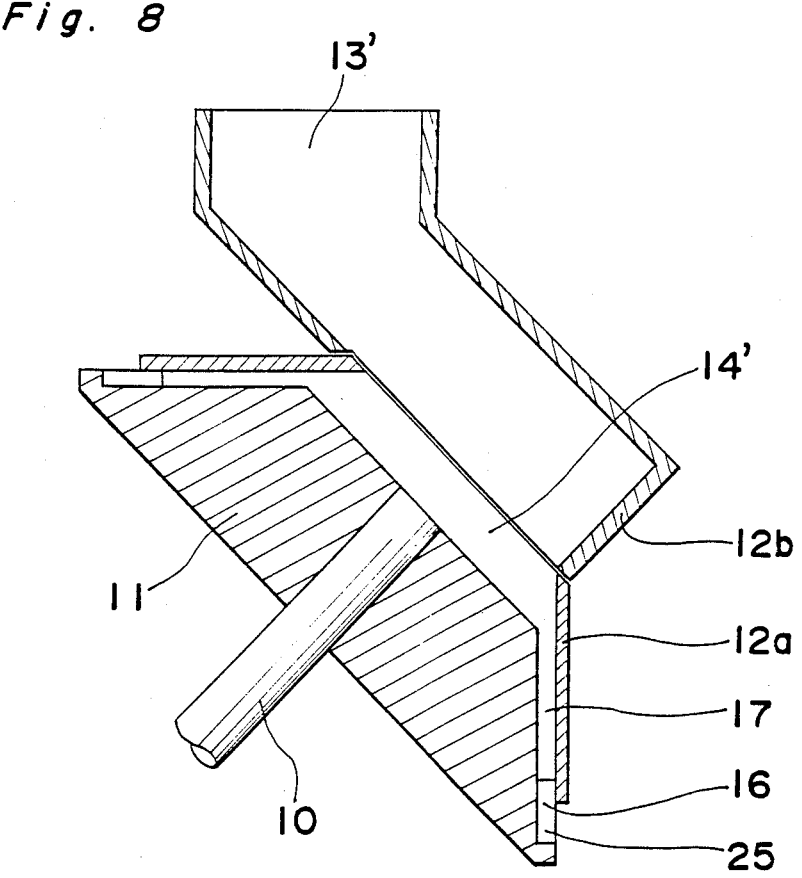

In the embodiment shown in FIG. 8, the hopper 12 comprises an annular flared member 12a, similar to the flared flange 28 employed in the foregoing embodiments, which member 12a is secured to the drum 11 for rotation together therewith. The hopper also comprises a guide chute 12b having one end open to provide a supply opening 13' and the other end open to communicate with a chamber 14' inside the flared member 12a. The hopper shown in FIG. 8 is of two-piece construction with the flared member 12a and the guide chute 12b rotatable and stationary, respectively.

Figure 9:
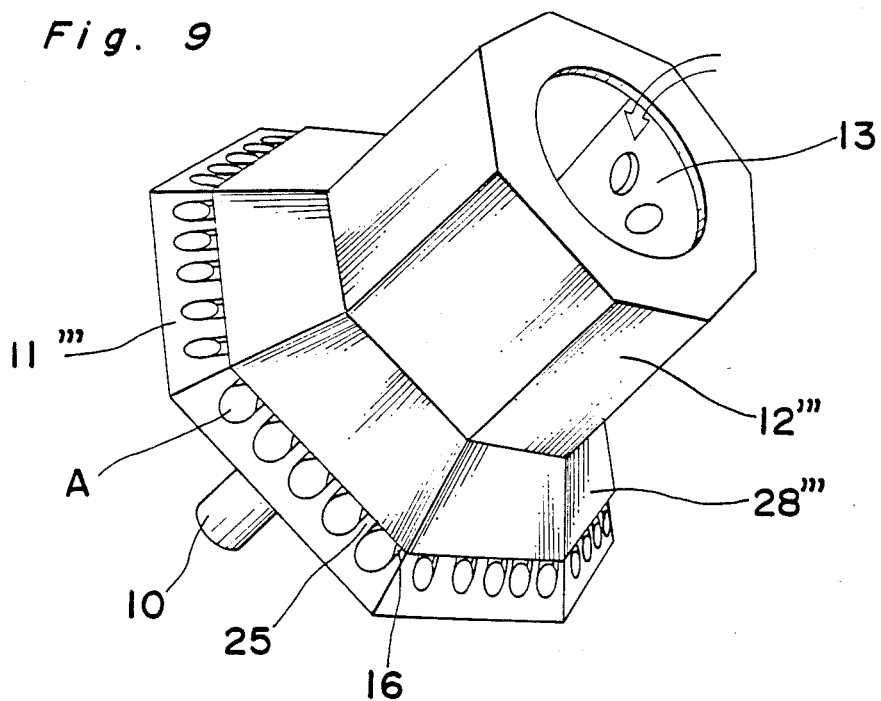
FIG. 9 is a perspective view of the apparatus according to a sixth embodiment of the present invention.

The transport drum may be of a shape similar to a multilateral pyramid as shown by 11''', in which case the body of the hopper defining the chamber 14 has a polygonal cross-section as shown by 12''' and likewise the flared flange is similar in shape to the cross-sectional representation of the drum 11''' as shown by 28'''. The supply device according to the embodiment of FIG. 9 will function in a manner similar to that according to the embodiment of FIGS. 1 to 4, with the difference, however, that, the drum 11''' is intermittently rotated, so that the removal of the product from the associated pockets can be easily performed at the pick-up station.

Figure 10:
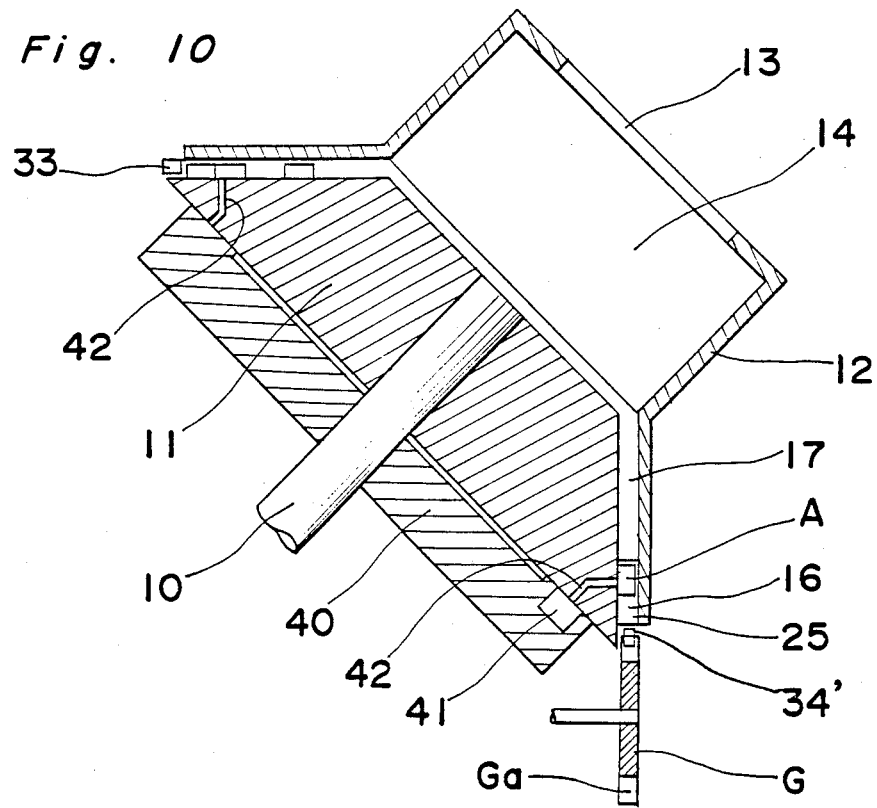
FIG. 10 is a view similar to FIG. 1, showing the apparatus according to a seventh embodiment of the present invention.
Figure 11:
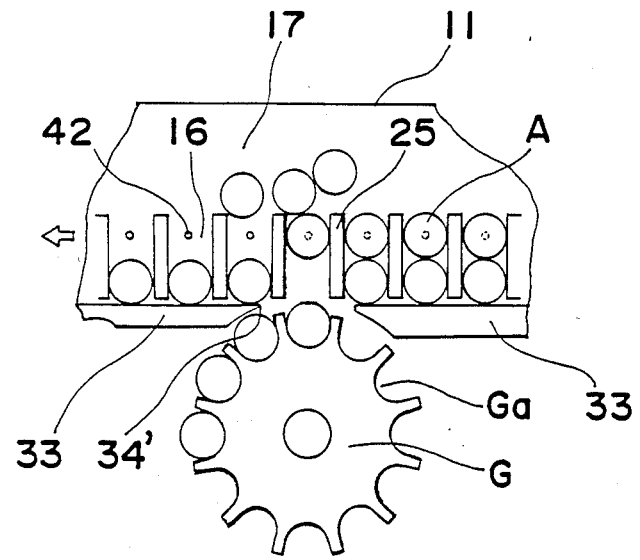
FIG. 11 is a front elevational view, on an enlarged scale, of a portion of the apparatus shown in FIG. 8.

In the embodiment shown in FIG. 10, the pick-up port which, in the embodiment of FIGS. 1 to 4, has been described as formed in the guide plate 33 at a location in register with some of the pockets 16 then laid horizontally is formed, is shown by 34', in the guide plate 33 at a location in register with some of the pockets 16 then directed vertically downwards so that the products A can be successively removed from the associated pockets 16 in a direction downwards. The removal of the products from the pockets is carried out with the aid of a star wheel G arranged below the outer peripheral surface of the drum 11 adjacent the pick-up port 34' and driven in synchronized relationship with the rotation of the drum 11, said star wheel having, as best shown in FIG. 11, a plurality of circumferentially equally spaced recesses Ga each capable of receiving one product A for the transportation towards a subsequent processing station.

For avoiding the downward fall of the next succeeding product in each pocket then aligned with the pick-up station 34' in the embodiment of FIG. 10, a lower peripheral edge portion of the drum 11 is formed with a plurality of suction passages 42 equal in number to the pockets 16 in the drum 11, each of said suction passages 42 having one end opening into the respective pocket 16 at a location aligned with the product next to the product ready to be removed by the star wheel G. The opposite ends of the respective suction passages 42 open in the base of the drum 11 in circular configuration concentric with the axis of rotation of the drum 11. These suction passages 42 are selectively communicated with a source of vacuum during each rotation of the drum 11 through a suction pocket 41 defined in a back-up plate 40 in alignment with the path of movement of the opposite ends of the passages 42. The back-up plate 40 is stationarily supported and is normally urged in one direction so as to slidingly contact the base of the drum 11. The suction pocket 41 in the back-up plate is so formed and so positioned as to communicate with the vacuum source of one of the pockets 16 which is then aligned with the pick-up station whereby the lower one of the products accommodated in said one of the pockets can be permitted to leave such one of the pockets onto the star wheel G and the upper one will be retained therein, respectively. The guide plate 33 positioned radially exteriorly of the pockets serves to avoid the premature separation of the products from the associated pockets except for the one then aligned with the pick-up station.

Figure 12:
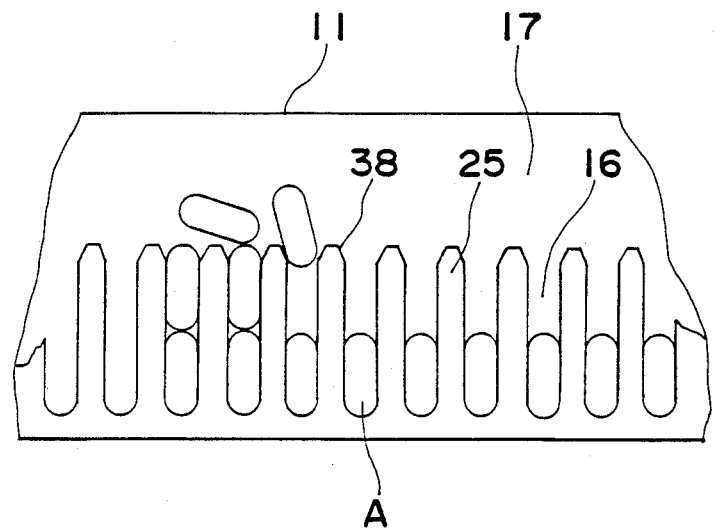
FIG. 12 is a view similar to FIG. 2, showing a modification thereof.
Figure 13A:
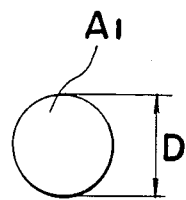
Figure 14A:
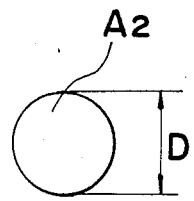
Figure 15A:
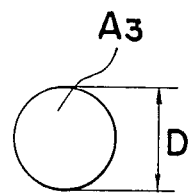
Figure 13B:
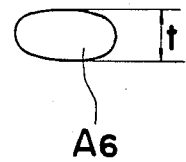
Figure 14B:
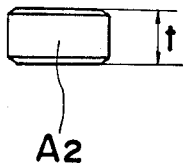
Figure 15A:
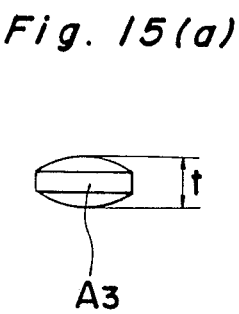
Figure 16A:
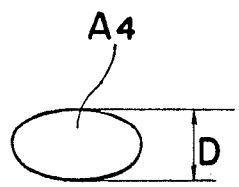
Figure 17:
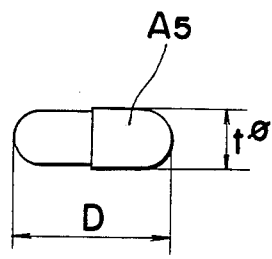
FIGS. 17 and 18 are side views of hard and soft capsules that can be handled in the apparatus of the present invention, respectively.
Figure 16B:
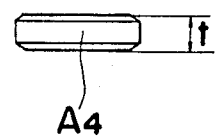
Figure 18:
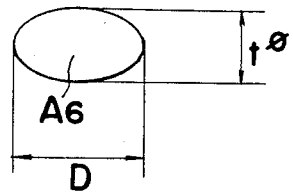

FIG. 12 is a view similar to FIG. 2, showing a modification of the pockets. As shown, the free end of each of the projections 25 is chamferred to facilitate the entry of any one of the products into the respective pocket 16. It is to be noted that, though each of the products shown in FIG. 12 is of a generally elongated shape, the products which the apparatus according to the present invention can handle include various types of tablets as shown in FIGS. 13(a) and 13(b), FIGS. 14(a) and 14(b), FIGS. 15(a) and 15(b), and FIGS. 16(a) and 16(b), respectively, hard capsules as shown in FIG. 17, and soft capsules as shown in FIG. 18. In any event, the solid pharmaceutical product which the apparatus according to the present invention can handle is of a type having a length, a width and a thickness.

In practice, the particular dimensions of each of the pockets in the transport drum are to be selected in consideration of the size of each of the pharmaceutical products to be handled by the apparatus according to the present invention.

Although the present invention has been fully described in connection with the preferred embodiments thereof with reference to the accompanying drawings, it is to be noted that various changes and modifications will be apparent to those skilled in the art. By way of example, in the foregoing embodiments, the transport drum has been described as detachably mounted on the inclined drive shaft. This arrangement is particularly advantageous in that the transport drum per se can be cleaned or repaired separate from the machine proper and in that single machine can be used to accommodate different types of pharmaceutical products merely by replacing one transport drum with another transport drum having different pockets. However, the transport drum may not always be detachably mounted on the inclined drive shaft, but may be rigidly mounted thereon.

Accordingly, such changes and modifications are to be understood as included within the scope of the present invention as defined by the appended claims unless they depart therefrom.

What is claimed is:

1. An article supply apparatus for pharmaceutical products each having predetermined dimensions of length, width and thickness, said apparatus comprising:

a rotary drum having at least a portion of the outer peripheral surface thereof frusto-conical in shape, said drum being rotatable around the conical axis and having the conical axis inclined at a predetermined angle with the end toward the smaller diameter of the frusto-conical surface portion extending upwardly, with the upper profile of the frusto-conical surface portion as viewed in elevation, lying substantially in a horizontal direction and the lower profile of the frusto-conical surface portion lying substantially in a vertical direction, a lower region of the frusto-conical surface portion which is toward the lower end of the conical axis having thereon a plurality of radial projections of predetermined dimension in the radial direction and spaced around the circumference thereof at a predetermined pitch from each other for defining product receiving pockets therebetween each having a width slightly greater than the width of the product, a further region of the frusto-conical surface portion extending from said projections to the upper end of said frusto-conical surface portion a distance greater than the length of the product and being smooth and constituting a slide surface for the product;

a hopper mounted on said drum for rotation with said drum, said hopper defining a product receiving space at the end of said drum toward the upper end of said conical axis and having a lower portion extending toward the lower end of said conical axis and extending parallel to and spaced from the further region of said frusto-conical shaped surface portion a distance slightly greater than the thickness of the product and covering a portion of said pockets for leaving a part of each pocket uncovered which is at least the size of one product, the space defined between said lower portion of said hopper and said slide surface opening into said product receiving space;

product take-out means positioned at a take-out position along the periphery of said rotary drum opposed to the exposed part of said pockets for removing products from successive pockets as the pockets move past said take-out position during rotation of said rotary drum; and means connected to said drum for rotating said drum around said conical axis;

whereby products are caused to move from the product received space across said slide surface during rotation of said drum for orienting the products with respect to the thickness direction and are caused to move into said pockets for being oriented in the widthwise direction, and the products can be taken out from the pockets at the take-out position in a predetermined posture.

2. An apparatus as claimed in claim 1 further comprising a product retaining plate means extending around said drum and covering the exposed parts of said pockets other than at said take-out position for preventing products from coming out of the pockets other than at said take-out position.

3. An apparatus as claimed in claim 1 in which each of said pockets has a length in the axial direction of the frusto-conical surface portion which is an integral multiple of the length of the product.

4. An apparatus as claimed in claim 1 in which said take-out position is at said upper profile of said frusto-conical surface portion.

5. An apparatus as claimed in claim 1 in which said take-out position is at said lower profile of said frusto-conical surface portion.

6. An apparatus as claimed in claim 1 further comprising suction means in said drum and opening into said pockets at other than said take-out position for retaining said product in said pockets.

7. An apparatus as claimed in claim 1 in which said frusto-conical surface portion is a right circular frusto-conical surface portion.

8. An apparatus as claimed in claim 1 in which said frusto-conical surface portion is a rght polygonal frusto-conical surface portion.

* * * * *